US007251616B1

(12) United States Patent
Perttunen

(10) Patent No.: US 7,251,616 B1
(45) Date of Patent: Jul. 31, 2007

(54) METHODS, ARTICLES AND APPARATUS FOR ADVERTISING BASED ON AN ATTRIBUTE OF A COMPUTER NETWORK RESOURCE

(76) Inventor: Cary D. Perttunen, 11764 Raintree Ct., Shelby Township, MI (US) 48315

( * ) Notice: Subject to any disclaimer, the term of this patent is extended or adjusted under 35 U.S.C. 154(b) by 1755 days.

(21) Appl. No.: 09/629,013

(22) Filed: Jul. 31, 2000

(51) Int. Cl.
*G06Q 30/00* (2006.01)
(52) U.S. Cl. ...................................................... 705/14
(58) Field of Classification Search .................... 705/1, 705/14
See application file for complete search history.

(56) References Cited

U.S. PATENT DOCUMENTS

| | | | |
|---|---|---|---|
| 5,675,733 A | 10/1997 | Williams | |
| 5,774,670 A | 6/1998 | Montulli | |
| 5,948,061 A | 9/1999 | Merriman et al. | |
| 5,986,651 A | 11/1999 | Reber et al. | |
| 5,987,469 A | 11/1999 | Lewis et al. | |
| 5,995,105 A | 11/1999 | Reber et al. | |
| 6,078,916 A * | 6/2000 | Culliss ........................... | 707/5 |
| 6,104,400 A | 8/2000 | Halachmi et al. | |
| 6,144,962 A | 11/2000 | Weinberg et al. | |
| 6,145,000 A | 11/2000 | Stuckman et al. | |
| 6,269,361 B1 * | 7/2001 | Davis et al. .................... | 707/3 |
| 6,308,202 B1 * | 10/2001 | Cohn et al. .................. | 709/217 |
| 6,421,675 B1 * | 7/2002 | Ryan et al. .................. | 707/100 |
| 6,460,038 B1 * | 10/2002 | Khan et al. .................... | 707/10 |
| 6,480,853 B1 * | 11/2002 | Jain ............................. | 707/10 |
| 6,489,968 B1 * | 12/2002 | Ortega et al. ................. | 34/713 |

2001/0034646 A1 10/2001 Hoyt et al.

FOREIGN PATENT DOCUMENTS

WO WO 99/39281 * 8/1999

OTHER PUBLICATIONS

"Netscape's Communicator third party cookie option foiled," Dec. 11, 1997, http://www.cookiecentral.com/dsc3.htm.*
Johnson et al., Applied Multivariate Statistical Analysis, 1982, pp. 532-573, Prentice-Hall, Englewood Cliffs.
Tucker, Applied Combinatorics, Second Edition, 1984, pp. 28-31 and 80-131, John Wiley & Sons, New York.
Luger et al., Artificial Intelligence and the Design of Expert Systems, 1989, pp. 88-99, Benjamin/Cummings Publishing, Redwood City.
CRC Standard Mathematical Tables and Formulae, 29th Edition, 1991, pp. 106-107, CRC Press, Boca Raton.

(Continued)

Primary Examiner—Jeffrey D. Carlson

(57) ABSTRACT

A Web resource comprising a plurality of user-selectable hyperlinks to a plurality of Web resources is provided to a client node via a computer network. The Web resource comprises a plurality of advertiser-usable variables within at least one script. The advertiser-usable variables include a first advertiser-usable variable specific to a first Web resource and a second advertiser-usable variable specific to a second Web resource. An advertisement server node reads the advertiser-usable variables and stores same either at the client node or at the advertisement node. After a first hyperlink is user-selected from the Web resource, the advertisement server node retrieves the first advertiser-usable variable corresponding to the first Web resource. An advertisement is selected from a plurality of advertisements based on the first advertiser-usable variable. The advertisement is provided to the client node to display with the first Web resource.

32 Claims, 2 Drawing Sheets

OTHER PUBLICATIONS

American Heritage Dictionary of the English Language, Third Edition, 1992, inside back cover, Houghton Mifflin, Boston.

"The best chart type for my data," help screen from Microsoft Excel for Windows 95, 1995.

Using Visio Products, 1997, pp. 119-122, 185-202 and 207-232, Visio Corporation, Seattle.

HYMAN, Dynamic HTML for Dummies, 1997, pp. 63-79, IDG Books, Foster City.

Lehto et al., Official Microsoft FrontPage 98 Book, 1997, pp. 32-52, Microsoft Press, Redmond.

Tittel et al., HTML 4 for Dummies, 1998, pp. 12-13 and 283-293, IDG Books, Foster City.

"Aurigin Announces General Availability of Version 6.0 of its Intellectual Property Asset Management System," Web page from Aurigin Systems, Oct. 1998.

"The Brain," Web page from PC Magazine Online, Apr. 1998.

"Roland Introduces HPD-15 HandSonic Hand Percussion Pad", Feb. 3, 2000, Roland Corporation U.S., Los Angeles.

"HPD-15 HandSonic", printed from the Internet on Jan. 3, 2001, http://209.144.99.11/PRODUCTS/hadrware/hpd15.htm.

"DoubleClick AltaVista Rate Card", printed from the Internet on Jun. 10, 2000 from www.doubleclick.net.

"DoubleClick Network Rate Card", printed from the Internet on Jun. 11, 2000 from www.doubleclick.net.

* cited by examiner

METHODS, ARTICLES AND APPARATUS FOR ADVERTISING BASED ON AN ATTRIBUTE OF A COMPUTER NETWORK RESOURCE

TECHNICAL FIELD

The present invention relates to methods, articles and apparatus for advertising.

BACKGROUND OF THE INVENTION

Many Internet portals provide a search engine with which a user may initiate an Internet search. The search engine returns a list of Web pages based upon a search expression received from the user.

Some search engines display a similarity value for each Web page in the list. Each similarity value numerically indicates a degree of correlation or relevance between its corresponding Web page and the search expression.

Oftentimes, the Web pages in the list are sorted based on the similarity values. By sorting the Web pages in this manner, the list presents highly-relevant Web pages before lesser-relevant Web pages.

Some Internet portals provide directories of Web pages. These directories provide a tree-like structure of categories and subcategories within which Web pages are classified.

DoubleClick, Inc. provides various Internet advertising solutions. These solutions include providing advertising for the ALTAVISTA™ Internet portal. Advertising on a search results page may be targeted based upon a keyword in a search expression submitted to the ALTAVISTA™ Internet portal.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF PREFERRED EMBODIMENTS

Improved methods, articles and apparatus for advertising are disclosed herein. Advertising for a Web resource is targeted and/or accounted for based upon an advertiser-usable variable specific to the Web resource. The advertiser-usable variable is provided by a referring Web resource having a hyperlink to the Web resource. The advertiser-usable variable may comprise either a similarity value between the Web resource and a search expression, a similarity value between the Web resource and the referring Web resource, or a tree-defined attribute of the Web resource, for example.

After the hyperlink is user-selected from the referring Web resource, an advertisement is selected from a plurality of advertisements based on the advertiser-usable variable. The advertisement is provided to the client node to display with the Web resource.

In this way, different referring Web resources providing a hyperlink to the Web resource may provide different values of the advertiser-usable variable specific to the Web resource. For example, one referring Web resource may use one tree to define a tree-defined attribute of the Web resource, and another referring Web resource may use a different tree to define a tree-defined attribute of the Web resource. Thus, different ones of the advertisements may be displayed with the Web resource depending on which referring Web resource's hyperlink was user-selected.

The present disclosure also contemplates a single referring Web resource which provides varying values of the tree-defined attribute of the Web resource. For example, the value of the tree-defined attribute of the Web resource may be dependent upon a search expression which identified the Web resource. Thus, different ones of the advertisements may be displayed with the Web resource for different searches which identified the Web resource.

Figure 1:
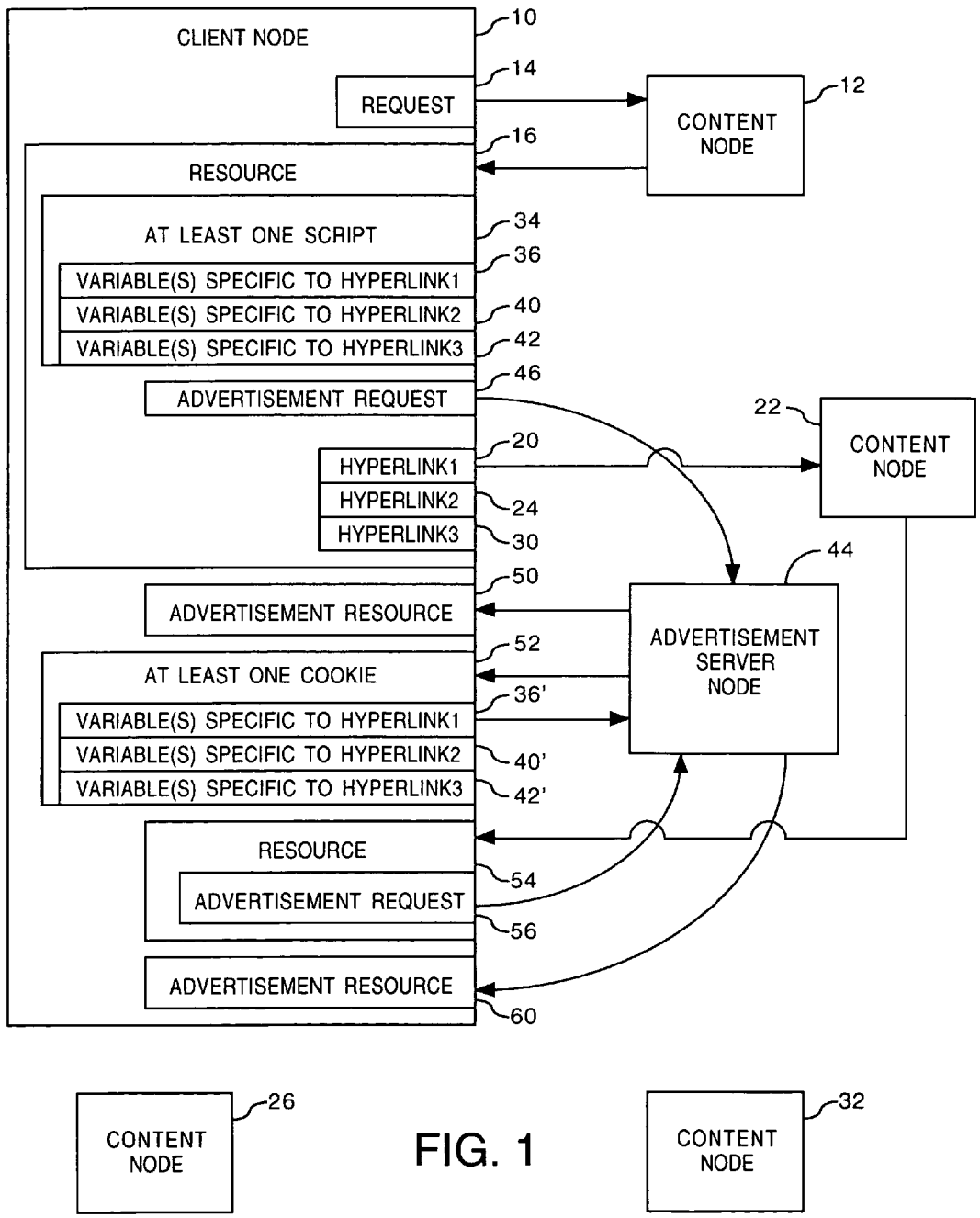
FIG. 1 is a block diagram of an embodiment of a system for providing advertising.

FIG. 1 is a block diagram of an embodiment of a system for providing advertising. A client node 10 generates and sends a request message 14 to a content node 12 via a computer network (not specifically illustrated) in accordance with a communication protocol. Examples of the client node 10 include, but are not limited to, a client computer system and a personal digital assistant. Examples of the content node 12 include, but are not limited to, a server computer system. Examples of the computer network include, but are not limited to, an internet, an intranet and an extranet. Examples of the protocol include, but are not limited to, HTTP (hypertext transfer protocol) and WAP (wireless application protocol).

The request message 14 requests a resource, such as a Web resource, from the content node 12. In response to the request message 14, the content node 12 generates and sends one or more response messages to the client node 10 via the computer network. The one or more response messages provides a Web resource 16 to the client node 10 via the computer network.

The Web resource 16 comprises a plurality of user-selectable hyperlinks. For purposes of illustration and example, the user-selectable hyperlinks include a first user-selectable hyperlink 20 to a first Web resource available from a first content node 22, a second user-selectable hyperlink 24 to a second Web resource available from a second content node 26, and a third user-selectable hyperlink 30 to a third Web resource available from a third content node 32. Each of the content nodes 22, 26 and 32 may be embodied by a respective one of three different server computer systems, for example. The content nodes 22, 26 and 32 may have any physical location relative to the content node 12. For example, each of the content nodes 22, 26 and 32 may be either proximate to or distantly located from the content node 12. Similarly, each of the content nodes 22, 26 and 32 may have any physical location relative to others of the content nodes 22, 26 and 32. For example, each of the content nodes 22, 26 and 32 may be located in geographically diverse locations. Although illustrated with three user-selectable hyperlinks, the Web resource 16 may comprise any number of user-selectable hyperlinks to a plurality of Web resources in general.

To identify the plurality of Web resources, the content node 12 may perform a search based on a search expression received from the client node 10. The search expression may be user-entered using an input device such as a keyboard, a touch screen, a touch pad or a voice input device associated with the client node 10. The search expression may contain one or more words in the form of either a Boolean search expression or a natural language search expression, for example. The search expression may include information from a plurality of user-enterable fields to limit the scope of the search. The search expression may include an image or encoded audio.

The search performed via the content node 12 yields search results comprising the plurality of Web resources, the plurality of Web resources being a subset of a larger set of Web resources. The content node 12 may use scripting code to provide, within the Web resource 16, the user-selectable hyperlinks associated with the search-identified Web resources.

The Web resource 16 further comprises a plurality of advertiser-usable variables within at least one script 34. Each of the at least one script 34 may include script code either directly within the Web resource 16, or within a separate file called by computer program code within the Web resource 16. Examples of programming languages for the at least one script 34 include, but are not limited to, JavaScript and VBScript.

For purposes of illustration and example, the advertiser-usable variables include one or more advertiser-usable variables 36 specific to the first Web resource, one or more advertiser-usable variables 40 specific to the second Web resource, and one or more advertiser-usable variables 42 specific to the third Web resource. Each of the one or more advertiser-usable variables 36, 40 and 42 has a corresponding value usable by an advertisement server node 44 to select advertising content to display with its corresponding Web resource. The advertisement server node 44 may be embodied by a server computer system, for example. The advertisement server node 44 may have any physical location relative to the content nodes 12, 22, 26 and 32.

In the case of the Web resource 16 providing search results, the one or more advertiser-usable variables 36 may indicate a similarity value between the search expression and the first Web resource, the one or more advertiser-usable variables 40 may indicate a similarity value between the search expression and the second Web resource, and the one or more advertiser-usable variables 42 may indicate a similarity value between the search expression and the third Web resource. Each similarity value indicates a degree of similarity, relevance or correlation between the search expression and its corresponding Web resource. Preferably, each similarly value numerically indicates the degree of similarity, relevance or correlation. For example, each similarly may comprise an integer from 0 to 100. Alternatively, each similarity value may qualitatively indicate the degree of similarity, relevance or correlation. For example, each similarity value may indicate either high similarity, moderate similarity or low similarity. Regardless of whether the similarity value is quantitative or qualitative, it is preferred that the similarity value be capable of indicating a plurality of different levels of similarity. More preferably, the similarity value is capable of indicating at least three different levels of similarity.

Alternatively, for both search and non-search applications, the content node 12 may determine a tree which relates the plurality of Web resources. In this case, each of the one or more advertiser-usable variables 36, 40 and 42 may include a value defined by the tree. The content node 12 may use various computer-readable data structures to represent the tree in a computer-readable form using a computer-readable medium.

Before proceeding, a review of trees and graph-related terminology is provided. A graph is definable by a set of nodes and a set of edges joining or associating different pairs of distinct nodes. The edges in the graph may be either directed or undirected.

Alternative terminology may be used to describe the graph. Examples of synonyms of "node" include, but are not limited to, "vertex" and "state". Examples of synonyms of "edge" include, but are not limited to, "arc" and "link". Therefore, the herein-disclosed methods, articles, apparatus, and examples should not be limited by the selected terminology used to describe the graph.

A first node is said to be adjacent to a second node if there is an edge from the first node to the second node. A path is definable by a sequence of nodes wherein each consecutive pair of nodes in the sequence is adjacent.

A tree is a graph having a unique path from a designated node, called a root node, to each of its other nodes. If the tree is undirected, then any of its nodes can be designated to be the root node. An undirected tree can be made into a directed tree by directing all edges away from the designated root node.

Each node in a directed tree, except for the root node, is a child node of a unique parent node from which an edge is directed thereto. Nodes having the same parent node are called siblings. Nodes of a directed tree with no children are called leaf nodes. Nodes having at least one child are called internal nodes. The level number of a node is defined as the number of edges in the path between the node and the root node. The height of the tree is the largest level number of any node.

If each internal node of a rooted tree has m children, the tree is called an m-ary tree. If m=1, the tree is unary. If m=2, the tree is binary. If m=3, the tree is ternary.

Each of the Web resources is represented by a corresponding node of the tree. Relationships between Web resources are represented by edges in the tree. Examples of edge-represented relationships between items include, but are not limited to, a degree of similarity, a hyperlink, an associative link, a state of being an element of, a state of being contained in, a state of being associated with, a state of reporting to, a state of being in a category, a state of depending from, and a state of being a reply to.

The tree may be unary to define a browsing sequence for the Web resources. In other cases, the tree is non-unary, i.e. the tree has at least one internal node with two or more child nodes. In some cases for a non-unary tree, the tree may have more leaf nodes than a number of child nodes emanating from its root node. Regardless of whether the tree is unary or non-unary, it is preferred that the tree has a height of at least two. In some cases, the tree may have a height of three or greater.

For Web resources comprising computer-readable messages, an edge in the tree may indicate that one message is a reply to another message. Thus, a reply message is a child of its parent message, and two reply messages to the same parent message are siblings. Each base message, i.e. each message that begins a new thread, may have an associated edge to a root node in the tree. If a search is performed, the root node may represent a Web resource associated with the search expression. Regardless of whether a search is performed, the root node may represent a Web resource associated with a discussion group of which the messages are elements.

In some embodiments, the content node 12 provides the tree by determining an optimum path tree based upon a first plurality of similarity values between the search expression and the Web resources, and a second plurality of similarity values between pairs of the Web resources. The optimum path tree indicates a respective optimum path between the search expression and each of the plurality of Web resources.

The optimum path between the search expression and a Web resource has an optimum function value of similarity values between the search expression and the Web resource. Examples of the function whose optimum value dictates the optimum path include, but are not limited to, a sum of similarity values between the search expression and the Web resource, and a product of similarity values between the search expression and the Web resource. To determine an optimum product of similarity values, an additive optimum path algorithm may be performed on a logarithm of the similarity values. For example, if the similarity values are numerical values between 0% and 100%, then an additive minimum path algorithm may be performed on a negative logarithm of the non-zero similarity values, e.g.—log(similarity value), to determine a maximum product of similarity values.

As is known in the art of network algorithms, examples of algorithms to compute the shortest paths include, but are not limited to, Dijkstra's algorithm and Floyd's algorithm. Those having ordinary skill can review shortest path algorithms on pp. 123–127 of A. Tucker, *Applied Combinatorics*, Second Edition, John Wiley & Sons, 1984, which is hereby incorporated by reference into this disclosure.

Alternatively, the content node 12 may provide the tree by determining a spanning tree based upon the first plurality of similarity values and the second plurality of similarity values. Examples of the spanning tree include, but are not limited to, an optimum spanning tree such as a minimum spanning tree, and a search tree.

The optimum spanning tree has an optimum function value of similarity values. Examples of the function whose optimum value dictates the optimum spanning tree include, but are not limited to, a sum of similarity values, and a product of similarity values. To determine an optimum product of similarity values, an additive optimum spanning tree algorithm may be performed on a logarithm of the similarity values.

As is known in the art of network algorithms, examples of algorithms to compute a minimum spanning tree include, but are not limited to, Kruskal's algorithm and Prim's algorithm. Those having ordinary skill can review minimum spanning trees on pp. 127–131 of A. Tucker, *Applied Combinatorics*, Second Edition, John Wiley & Sons, 1984, which is hereby incorporated by reference into this disclosure.

Examples of the search tree include, but are not limited to, a depth-first search spanning tree, a breadth-first search spanning tree, or a best-first search spanning tree. Those having ordinary skill can review search trees on pp. 80–122 of A. Tucker, *Applied Combinatorics*, Second Edition, John Wiley & Sons, 1984, which is hereby incorporated by reference into this disclosure.

Each of the one or more advertiser-usable variables 36, 40 and 42 may indicate a level number of its corresponding Web resource within the tree. For example, the one or more advertiser-usable variables 36 may indicate a level number of the first Web resource within the tree, the one or more advertiser-usable variables 40 may indicate a level number of the second Web resource within the tree, and the one or more advertiser-usable variables 42 may indicate a level number of the third Web resource within the tree. Each level number may be indicated numerically by an integer, e.g. 1, 2, 3, etc.

Alternatively, each of the one or more advertiser-usable variables 36, 40 and 42 may indicate whether its corresponding Web resource is an internal resource of the tree or a leaf resource of the tree. For example, the one or more advertiser-usable variables 36 may indicate that the first Web resource is an internal resource of the tree, and the one or more advertiser-usable variables 40 may indicate that the second Web resource is an internal resource of the tree. As another example, the one or more advertiser-usable variables 36 may indicate that the first Web resource is an internal resource of the tree, and the one or more advertiser-usable variables 40 may indicate that the second Web resource is a leaf resource of the tree. As a further example, the one or more advertiser-usable variables 36 may indicate that the first Web resource is a leaf resource of the tree, and the one or more advertiser-usable variables 40 may indicate that the second Web resource is a leaf resource of the tree.

As another alternative, each of the one or more advertiser-usable variables 36, 40 and 42 may be based on the ancestry of its corresponding Web resource within the tree. The one or more advertiser-usable variables 36 may be based on which of the Web resources having a predetermined level number is an ancestor of the first Web resource in the tree, the one or more advertiser-usable variables 40 may be based on which of the Web resources having the predetermined level number is an ancestor of the second Web resource in the tree, and the one or more advertiser-usable variables 42 may be based on which of the Web resources having the predetermined level number is an ancestor of the third Web resource in the tree. Of particular interest is where the predetermined level number is one.

Preferably, each of the one or more advertiser-usable variables 36, 40 and 42 also identifies its corresponding Web resource. For example, the one or more advertiser-usable variables 36 may include a computer address of the first Web resource, the one or more advertiser-usable variables 40 may include a computer address of the second Web resource, and the one or more advertiser-usable variables 42 may include a computer address of the third Web resource. Examples of each computer address include, but are not limited to, a uniform resource locator (URL), a uniform resource name (URN), a uniform resource identifier (URI) and an internet protocol (IP) address. Alternatively, the one or more advertiser-usable variables 36 may include a first non-address identifier of the first Web resource, the one or more advertiser-usable variables 40 may include a second non-address identifier of the second Web resource, and the one or more advertiser-usable variables 42 may include a third non-address identifier of the third Web resource.

In some embodiments, the at least one script 34 includes two advertiser-usable variables for each hyperlink: one identifying the Web resource corresponding to the hyperlink, and another indicating either the similarity value or the tree-defined value. Alternatively, a single advertiser-usable variable may both identify the Web resource and indicate either the similarity value or the tree-defined value.

The Web resource 16 includes computer program code to generate a request message, such as an advertisement request message 46 or another request message. Based on the computer program code, the client node 10 generates and sends the advertisement request message 46 to the advertisement server node 44 via the computer network. The advertiser request message 46 requests a resource, such as a Web resource, from the advertisement server node 44. In response to the advertisement request message 46, the advertisement server node 44 generates and sends one or more response messages to the client node 10 via the computer network. The one or more response messages may provide an advertisement resource 50 to the client node 10 via the computer network. Examples of the advertisement resource 50 include, but are not limited to, visible advertisements such as a banner advertisement, a button advertisement, a badge advertisement, a text link advertisement, a rich media advertisement and a pop-up window advertisement, and audible advertisements. The advertisement resource 50 is displayed with the Web resource 16 by the client node 10. It is noted that providing the advertisement resource 50 is optional.

Regardless of whether the advertisement resource 50 is provided, the one or more response messages facilitate reading the plurality of advertiser-usable variables 36, 40 and 42, and providing at least one cookie 52 for the client node 10 before any of the user-selectable hyperlinks 20, 24 and 30 have been user-selected from the Web resource 16 using the client node 10. The at least one cookie 52 stores the advertiser-usable variables 36', 40' and 42'.

A single cookie may store the all of the advertiser-usable variables 36', 40' and 42'. In this case, for example, the single cookie may store a string comprising all of the advertiser-usable variables 36', 40' and 42' and a delimiter to separate the variables. Alternatively, multiple cookies may store the advertiser-usable variables 36', 40' and 42'. In this case, for example, a first cookie may store the one or more advertiser-usable variables 36', a second cookie may store the one or more advertiser-usable variables 40', and a third cookie may store the one or more advertiser-usable variables 42'.

In general, the at least one cookie 52 may be either readable or unreadable by the content nodes 12, 22, 26 and 32. Typically, however, the at least one cookie 52 is unreadable by the content nodes 12, 22, 26 and 32.

After the at least one cookie 52 has been provided to the client node 10, any of the user-selectable hyperlinks 20, 24 and 30 may be user-selected from the Web resource 16 using the client node 10. For purposes of illustration and example, consider the user selecting the first user-selectable hyperlink 20 from the Web resource 16 using the client node 10. In response thereto, the client node 10 generates and sends a request message to the content node 22 via the computer network. The request message requests a resource, such as a Web resource, from the content node 22. In response to the request message, the content node 22 generates and sends one or more response messages to the client node 10 via the computer network. The one or more response messages provides a Web resource 54 to the client node 10 via the computer network.

The Web resource 54 includes computer program code to generate an advertisement request message 56. Based on the computer program code, the client node 10 generates and sends the advertisement request message 56 to the advertisement server node 44 via the computer network. Based on the advertisement request message 56, the one or more advertiser-usable variables 36' associated with the Web resource 54 are retrieved from the at least one cookie 52. Either the advertisement request message 56 or a variable within a script of the Web resource 54 may identify the Web resource 54 to facilitate the one or more advertiser-usable variables 36' being distinguished from the other variables 40' and 42' using the herein-disclosed Web resource identifiers in the at least one cookie 52.

Preferably, the one or more advertiser-usable variables 36' are retrieved by or otherwise communicated to the advertisement server node 44. In this case, the advertisement server node 44 selects an advertisement from a plurality of advertisements based on the one or more advertiser-usable variables 36'. Alternatively, the one or more advertiser-usable variables 36' are retrieved by the client node 10, which selects an advertisement from a plurality of advertisements based thereon.

The advertisement may be selected using one or more targeting criteria for the one or more advertiser-usable variables 36'. For example, some of the advertisements may have a targeting criterion to enable advertising only with Web resources having a similarity value within a prespecified range. An advertisement may have a respective numerical range of acceptable similarity values (e.g. from 85 to 100), or a respective qualitative range of acceptable similarity values (e.g. high similarity). In these cases, higher billing rates may be charged for advertising with Web resources having higher similarity values (all other factors being equal).

As another example, some of the advertisements may have a targeting criterion to enable advertising only with Web resources having a level number within a prespecified range. An advertisement may have a respective numerical range of acceptable level numbers (e.g. only a level number of 1, only a level number of 2, level numbers from 3 to 4, or level numbers of 3 and greater). In some cases, higher billing rates may be charged for advertising with Web resources having lower level numbers (all other factors being equal). Optionally, the tree defining the level number is unary, such as a browsing sequence for the Web resources.

As a further example, some of the advertisements may have a targeting criterion to enable advertising only with Web resources which are internal resources of a tree, and others may have a targeting criterion to enable advertising only with Web resources which are leaf resources of the tree. In some cases, higher billing rates may be charged for advertising with internal resources than for leaf resources (all other factors being equal).

As a still further example, some of the advertisements may have a targeting criterion to enable advertising only with Web resources having an ancestor resource, at a predetermined level number in the tree, which meets at least one criterion. In this case, for example, higher billing rates may be charged for advertising with Web resources having a higher-similarity-value ancestor resource at the predetermined level number (all other factors being equal).

In the case of the advertisement server node 44 selecting the advertisement, the advertisement server node 44 generates and sends one or more response messages to provide an advertisement resource 60 to the client node 10 via the computer network. Examples of the advertisement resource 60 include, but are not limited to, visible advertisements such as a banner advertisement, a button advertisement and a pop-up window advertisement, and audible advertisements. The advertisement resource 60 is displayed with the Web resource 54 by the client node 10.

Optionally, the advertisement server node 44 may update a data structure associated with the advertisement resource 60 based on the one or more advertiser-usable variables 36'. The data structure may include a count which is incremented based on the one or more advertiser-usable variables 36'. The count may indicate a number of impressions of the advertisement resource 60 for a particular range of an advertiser-usable variable. Alternatively, the count may indicate a number of click-throughs of the advertisement resource 60 for a particular range of an advertiser-usable variable. Each particular range may comprise a single value or a plurality of values.

The data structure is used to generate an advertising report associated with the advertisement resource 60. The advertising report may include a breakdown of a number of impressions and/or click-throughs for each particular range of an advertiser-usable variable.

Similar acts are performed in response to user-selection of the second user-selectable hyperlink 24 from the Web resource 16 using the client node 10. In particular, (a) a request message is generated and sent to the content node 26 via the computer network, (b) the content node 26 provides to the client node 10 via the computer network a second Web resource including computer program code to generate an associated advertisement request message, (c) the client node generates and sends the advertisement request message to the advertisement server node 44, (d) the advertising request message associated with the second Web resource is received by the advertisement server node 44, (e) the one or more advertiser-usable variables 40' is retrieved from the at least one cookie 52, (f) an advertisement from the plurality of advertisements is selected based on the one or more advertiser-usable variables 40', and (g) and the advertisement is provided to display with the second Web resource by the client node 10. Similar acts are performed in response to user-selection of the third user-selectable hyperlink 30 from the Web resource 16 using the client node 10.

Figure 2:
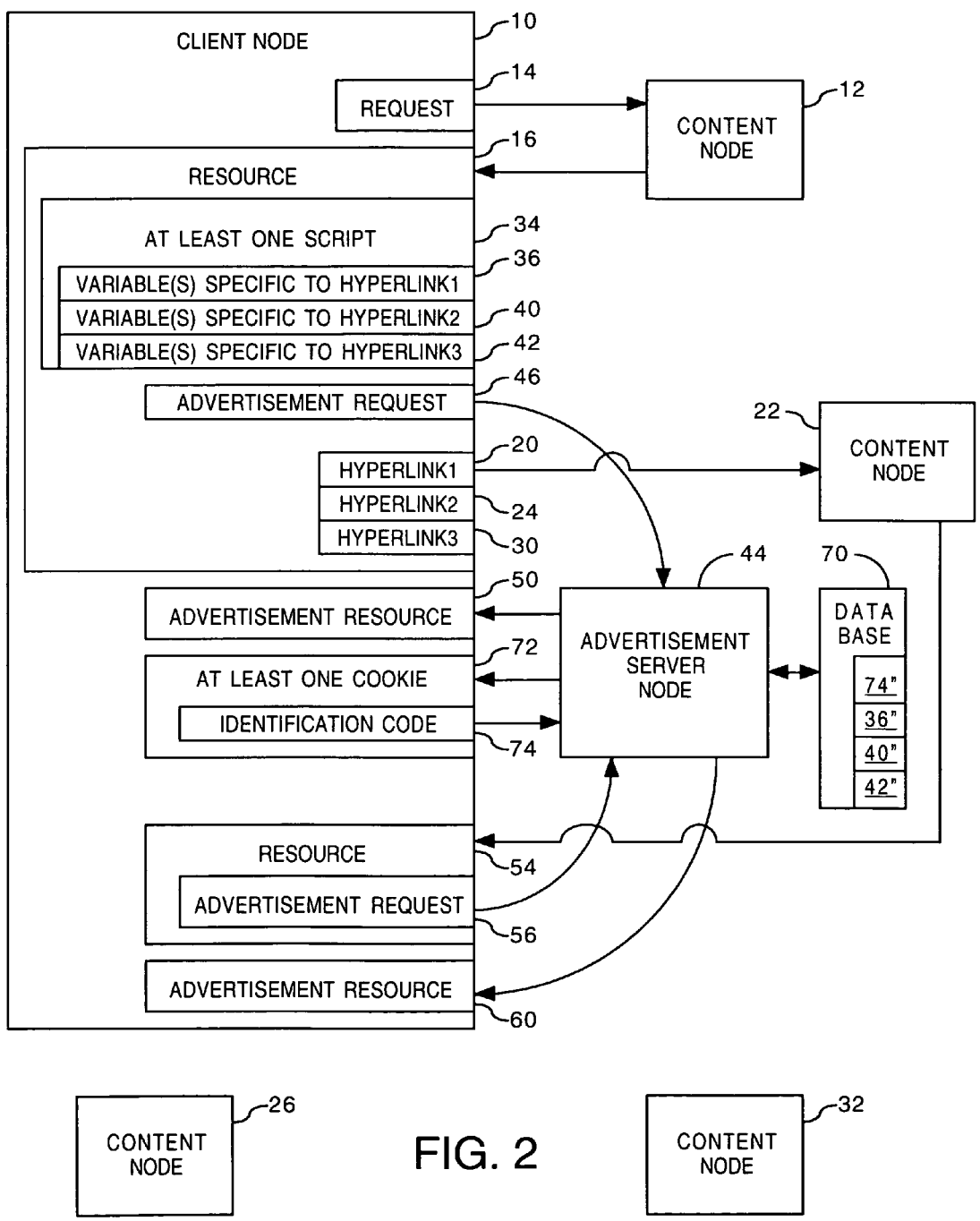
FIG. 2 is a block diagram of another embodiment of a system for providing advertising.

FIG. 2 is a block diagram of another embodiment of a system for providing advertising. The embodiment of FIG. 2 differs from the embodiment of FIG. 1 in that the advertisement server node 44, upon receiving the advertisement request message 46, reads the plurality of advertiser-usable variables 36, 40 and 42, and stores corresponding advertiser-usable variables 36", 40" and 42" in a database 70 before any of the user-selectable hyperlinks 20, 24 and 30 have been user-selected from the Web resource 16 using the client node 10.

Further, the advertisement server node 44 optionally provides at least one cookie 72 for the client node 10 before any of the user-selectable hyperlinks 20, 24 and 30 have been user-selected from the Web resource 16 using the client node 10. The at least one cookie 72 stores an identification code 74. The database 70 also stores an identification code 74" corresponding to the identification code 74. The identification codes 74 and 74" are used to associate the advertiser-usable variables 36", 40" and 42" in the database 70 to the client node 10. The database 70 may use various computer-readable data structures to store the identification code 74" and the advertiser-usable variables 36", 40" and 42" in a computer-readable form using a computer-readable medium.

In general, the at least one cookie 72 may be either readable or unreadable by the content nodes 12, 22, 26 and 32. Typically, however, the at least one cookie 72 is unreadable by the content nodes 12, 22, 26 and 32.

Alternatively, the identification code 74 may not be included in at least one cookie 72 and/or may not be provided by the advertisement, server node 44. In these cases, the identification code 74 may be pre-stored in the client node 10 to uniquely identify the client node 10. In this case, the advertisement server node 44 may read the identification code 74 from the client node 10, and thereafter store the corresponding identification code 74" in the database 70 and associate the corresponding identification code 74" with the advertiser-usable variables 36", 40" and 42".

After the advertiser-usable variables 36", 40" and 42" have been stored in the database 70, any of the user-selectable hyperlinks 20, 24 and 30 may be user-selected from the Web resource 16 using the client node 10. For purposes of illustration and example, consider the user selecting the first user-selectable hyperlink 20 from the Web resource 16 using the client node 10. In response thereto, the client node 10 generates and sends a request message to the content node 22 via the computer network. The request message requests a resource, such as a Web resource, from the content node 22. In response to the request message, the content node 22 generates and sends one or more response messages to the client node 10 via the computer network. The one or more response messages provides a Web resource 54 to the client node 10 via the computer network.

The Web resource 54 includes computer program code to generate the advertisement request message 56. Based on the computer program code, the client node 10 generates and sends the advertisement request message 56 to the advertisement server node 44 via the computer network. Based on the advertisement request message 56, the advertisement server node 44 uses the identification code 74 from the client node to retrieve one or more advertiser-usable variables 36" associated with the Web resource 54 from the database 70. Either the advertisement request message 56 or a variable within a script of the Web resource 54 may identify the Web resource 54 to facilitate the one or more advertiser-usable variables 36" being distinguished from the other variables 40" and 42" using the herein-disclosed Web resource identifiers in the database 70.

The advertisement server node 44 selects an advertisement from a plurality of advertisements based on the one or more advertiser-usable variables 36". The advertisement server node 44 generates and sends one or more response messages to provide the selected advertisement resource 60 to the client node 10 via the computer network. The advertisement resource 60 is displayed with the Web resource 54 by the client node 10.

Similar acts are performed in response to user-selection of either the second user-selectable hyperlink 24 or the third user-selectable hyperlink 30 from the Web resource 16 using the client node 10. Although not specifically illustrated, the database 70 typically stores identification codes and associated advertiser-usable variables for a plurality of different client nodes.

With reference to either FIG. 1 or FIG. 2, each of the client node 10, the content node 12, the content node 22, the content node 26, the content node 32 and the advertisement server node 44 may comprise one or more programmed computers. Each programmed computer may provide a particular functionality implemented using hardware and/or software and/or firmware.

Preferably, each programmed computer includes a processor responsive to a computer memory to perform a series of specifically identified operations dictated by a computer program. In this way, the computer program can cause the computer to act in a particular fashion.

Examples of the processor include, but are not limited to, a general purpose microprocessor, an application-specific integrated circuit (which may be either standard or custom), one or more discrete logic elements, a digital signal processor, one or more circuits, or any combination thereof. It is noted that the processor may be embodied by either a single processing unit or a plurality of processing units.

Examples of the computer memory include, but are not limited to, an electronic memory, a magnetic memory, an optical memory, and a magneto-optical memory. Examples of an electronic memory include, but are not limited to, a programmable electronic memory and a read-only, hard-wired electronic memory. Examples of a magnetic memory include, but are not limited to, a magnetic disk and a magnetic tape. The magnetic disk may be embodied by a magnetic floppy diskette or a magnetic hard drive, for example. Examples of an optical memory include, but are not limited to, an optical disk. The optical disk may be embodied by a compact disk or a DVD, for example.

Regardless of its form, the computer memory may be either read-only, once-writable, or rewritable.

In general, the processor may be responsive to any data structures, computer programs, and signals encoded on a computer-readable medium to perform an embodiment of any of the herein-disclosed methods and examples. Examples of the computer-readable medium include, but are not limited to, computer-readable storage media and computer-readable communication media. Examples of computer-readable storage media are described with reference to the computer memory. Examples of computer-readable communication media include, but are not limited to, an optical medium, an electronic medium, and an electromagnetic medium.

The client node 10 may cooperate in a client-server fashion with the advertisement server node 44 and the content nodes 12, 22, 26 and 32, for example. The client node 10 communicates with the advertisement server node 44 and the content nodes 12, 22, 26 and 32 in accordance with a communication protocol. Examples of the protocol include, but are not limited to, HTTP and WAP.

The client node 10 includes a display device to display Web resources and selected advertisement resources. Examples of the display device include, but are not limited to, a computer monitor, a television, a liquid crystal display, a cathode ray tube, and a gas plasma display.

The client node 10 receives user-initiated selections and other user input from one or more user input devices. Examples of input devices include, but are not limited to, a pointing device, a keyboard, and a voice input device. Examples of pointing devices include, but are not limited to, a mouse, a touchpad, a trackball, a joystick, a pointing stick and a touchscreen.

A selection of a hyperlink is detected in response to a user-initiated event. Examples of the user-initiated event include, but are not limited to, an on-click event, a double-click event, a mouse-move event, a mouse-over event, a mouse-out event, a mouse-up event, and a key depression event. The display and the one or more user input devices facilitate user interaction with the client node 10.

The client node 10 includes a transceiver to communicate with the computer network. Examples of the transceiver include, but are not limited to, a modem, a network interface, and a wireless transceiver.

It is noted that each of the herein-disclosed Web resources may include computer program code in a markup language such as hypertext markup language (HTML), wireless markup language (WML) or handheld device markup language (HDML). For example, some of the herein-disclosed Web resources may comprise World Wide Web pages.

It will be apparent to those skilled in the art that the disclosed inventions may be modified in numerous ways and may assume many embodiments other than the preferred forms specifically set out and described herein.

Accordingly, it is intended by the appended claims to cover all modifications which fall within the true spirit and scope of the present invention.

What is claimed is:

1. A method comprising:
   targeting an advertisement to a particular numerical range of one or more positions in browsing sequences of Web resources;
   receiving, from a client node, a user selection of a hyperlink to a Web resource having a browsing sequence position within the particular numerical range associated with the advertisement;
   selecting the advertisement to display with the Web resource based on said targeting and the browsing sequence position of the Web resource;
   providing the advertisement to the client node; and
   displaying, by the client node, the advertisement with the Web resource.

2. The method of claim 1 further comprising charging a higher billing rate for the advertisement for a first browsing sequence position than for a second browsing sequence position, wherein the first browsing sequence position is defined by a first level number and the second browsing sequence position is defined by a second level number, and wherein the first level number is less than the second level number.

3. The method of claim 1 further comprising:
   performing a search based on a search expression received from the client node to identify a plurality of search-identified Web resources that is a subset of a larger set of Web resources;
   providing, to the client node, a referring Web resource having user-selectable hyperlinks to the search-identified Web resources;
   wherein the hyperlink is one of the user-selectable hyperlinks of the referring Web resource.

4. The method of claim 1 wherein the particular numerical range consists of one position defined by one level number.

5. The method of claim 1 wherein the particular numerical range comprises a plurality of positions defined by a plurality of level numbers.

6. A method comprising:
   reading a plurality of advertiser-usable variables within at least one script of a referring Web resource from a client node, the referring Web resource comprising a plurality of user-selectable hyperlinks including a first user-selectable hyperlink to a first Web resource and a second user-selectable hyperlink to a second Web resource, the advertiser-usable variables including a first advertiser-usable variable specific to the first Web resource and a second advertiser-usable variable specific to the second Web resource;
   storing the first advertiser-usable variable and the second advertiser-usable variable in at least one cookie for the client node before any of the user-selectable hyperlinks has been user-selected from the referring Web resource using the client node; and
   after the first hyperlink has been user-selected from the referring Web resource using the client node, displaying by the client node a first advertisement with the first Web resource, wherein the first advertisement is targeted to the client node by an advertisement server node based on the first advertiser-usable variable stored in the at least one cookie.

7. The method of claim 6 further comprising, after the first user-selectable hyperlink has been user-selected from the referring Web resource using the client node:
   receiving a first advertising request associated with the first Web resource;
   retrieving the first advertiser-usable variable from the at least one cookie;
   selecting the first advertisement from a plurality of advertisements based on the first advertiser-usable variable; and
   providing the first advertisement to display with the first Web resource by the client node.

8. The method of claim 7 further comprising, after the second user-selectable hyperlink has been user-selected from the referring Web resource using the client node:

receiving a second advertising request associated with the second Web resource;
retrieving the second advertiser-usable variable from the at least one cookie;
selecting a second advertisement from the plurality of advertisements based on the second advertiser-usable variable;
providing the second advertisement to display with the second Web resource by the client node; and
displaying by the client node the second advertisement with the second Web resource.

9. The method of claim 7 further comprising updating a data structure associated with the first advertisement based on the first advertiser-usable variable.

10. The method of claim 6 further comprising:
receiving an advertising request associated with the referring Web resource, wherein said reading is performed in response to said receiving the advertising request.

11. The method of claim 6 wherein the first advertiser-usable variable and the second advertiser-usable variable are defined by a tree which relates a plurality of Web resources that include the first Web resource and the second Web resource.

12. The method of claim 11 wherein the first advertiser-usable variable indicates a level number of the first Web resource within the tree, and wherein the second advertiser-usable variable indicates a level number of the second Web resource within the tree.

13. The method of claim 11 wherein the first advertiser-usable variable indicates that the first Web resource is an internal resource of the tree, and wherein the second advertiser-usable variable indicates that the second Web resource is an internal resource of the tree.

14. The method of claim 11 wherein the first advertiser-usable variable indicates that the first Web resource is an internal resource of the tree, and wherein the second advertiser-usable variable indicates that the second Web resource is a leaf resource of the tree.

15. The method of claim 11 wherein the first advertiser-usable variable indicates that the first Web resource is a leaf resource of the tree, and wherein the second advertiser-usable variable indicates that the second Web resource is a leaf resource of the tree.

16. The method of claim 11 wherein the Web resources include a plurality of Web resources having a predetermined level number in the tree, wherein the first advertiser-usable variable is based on which of the Web resources having the predetermined level number is an ancestor of the first Web resource in the tree, and wherein the second advertiser-usable variable is based on which of the Web resources having the predetermined level number is an ancestor of the second Web resource in the tree.

17. The method of claim 16 wherein the predetermined level number is one.

18. The method of claim 6 wherein the at least one cookie is readable by the advertisement server node, but is unreadable by a content node which provides the first Web resource to the client node.

19. The method of claim 6 wherein the at least one cookie is readable by the advertisement server node, but is unreadable by a content node which provides the referring Web resource to the client node.

20. The method of claim 6 wherein the at least one cookie is readable by the advertisement server node, but is unreadable by content nodes which provide the referring Web resource and the first Web resource to the client node.

21. A method comprising:
reading a plurality of advertiser-usable variables within at least one script of a referring Web resource from a client node, the referring Web resource comprising a plurality of user-selectable hyperlinks including a first user-selectable hyperlink to a first Web resource and a second user-selectable hyperlink to a second Web resource, the advertiser-usable variables including a first advertiser-usable variable specific to the first Web resource and a second advertiser-usable variable specific to the second Web resource, wherein said reading is performed by an advertisement server node before any of the user-selectable hyperlinks has been user-selected from the referring Web resource using the client node;
storing the first advertiser-usable variable and the second advertiser-usable variable in a database of the advertisement server node before any of the user-selectable hyperlinks has been user-selected from the referring Web resource using the client node; and
after the first hyperlink has been user-selected from the referring Web resource using the client node, displaying by the client node a first advertisement with the first Web resource, wherein the first advertisement is targeted to the client node by the advertisement server node based on the first advertiser-usable variable stored in the database.

22. The method of claim 21 further comprising, after the first user-selectable hyperlink has been user-selected from the referring Web resource using the client node:
receiving a first advertising request associated with the first Web resource;
retrieving the first advertiser-usable variable from the database of the advertisement server node;
selecting the first advertisement from a plurality of advertisements based on the first advertiser-usable variable; and
providing the first advertisement to display with the first Web resource by the client node.

23. The method of claim 22 further comprising, after the second user-selectable hyperlink has been user-selected from the referring Web resource using the client node:
receiving a second advertising request associated with the second Web resource;
retrieving the second advertiser-usable variable from the database of the advertisement server node;
selecting a second advertisement from the plurality of advertisements based on the second advertiser-usable variable;
providing the second advertisement to display with the second Web resource by the client node; and
displaying by the client node the second advertisement with the second Web resource.

24. The method of claim 22 further comprising updating a data structure associated with the first advertisement based on the first advertiser-usable variable.

25. The method of claim 21 further comprising:
receiving an advertising request associated with the referring Web resource, wherein said reading is performed in response to said receiving the advertising request.

26. The method of claim 21 wherein the first advertiser-usable variable and the second advertiser-usable variable are defined by a tree which relates a plurality of Web resources that include the first Web resource and the second Web resource.

27. The method of claim 26 wherein the first advertiser-usable variable indicates a level number of the first Web resource within the tree, and wherein the second advertiser-usable variable indicates a level number of the second Web resource in the tree.

28. The method of claim 26 wherein the first advertiser-usable variable indicates that the first Web resource is an internal resource of the tree, and wherein the second advertiser-usable variable indicates that the second Web resource is an internal resource of the tree.

29. The method of claim 26 wherein the first advertiser-usable variable indicates that the first Web resource is an internal resource of the tree, and wherein the second advertiser-usable variable indicates that the second Web resource is a leaf resource of the tree.

30. The method of claim 26 wherein the first advertiser-usable variable indicates that the first Web resource is a leaf resource of the tree, and wherein the second advertiser-usable variable indicates that the second Web resource is a leaf resource of the tree.

31. The method of claim 26 wherein the Web resources include a plurality of Web resources having a predetermined level number in the tree, wherein the first advertiser-usable variable is based on which of the Web resources having the predetermined level number is an ancestor of the first Web resource in the tree, and wherein the second advertiser-usable variable is based on which of the Web resources having the predetermined level number is an ancestor of the second Web resource in the tree.

32. The method of claim 31 wherein the predetermined level number is one.

* * * * *